(12) United States Patent
Bogart

(10) Patent No.: US 10,098,331 B2
(45) Date of Patent: Oct. 16, 2018

(54) AUTOMATED FEEDER APPARATUS FOR DIRECTIONALLY DISCHARGING ANIMAL FEED

(71) Applicant: Mark Bogart, Joshua, TX (US)

(72) Inventor: Mark Bogart, Joshua, TX (US)

( * ) Notice: Subject to any disclaimer, the term of this patent is extended or adjusted under 35 U.S.C. 154(b) by 187 days.

(21) Appl. No.: 15/389,205

(22) Filed: Dec. 22, 2016

(65) Prior Publication Data

US 2017/0208781 A1    Jul. 27, 2017

(51) Int. Cl.
| | | |
|---|---|---|
| A01K 5/00 | (2006.01) | |
| A01K 5/02 | (2006.01) | |
| A01K 61/80 | (2017.01) | |
| A01C 17/00 | (2006.01) | |

(52) U.S. Cl.
CPC .......... *A01K 61/80* (2017.01); *A01K 5/0225* (2013.01); *A01K 5/0291* (2013.01); *A01C 17/001* (2013.01); *A01C 17/006* (2013.01); *Y02A 40/845* (2018.01)

(58) Field of Classification Search
CPC ..... A01C 17/001; A01C 17/006; A01C 15/02; A01C 17/008; A01C 15/00; A01C 15/008; A01C 15/04; A01C 17/005; A01C 7/02; E01C 19/20; A01K 39/014; A01K 5/00; A01K 5/02; A01K 5/0225; A01K 5/0291; A01K 5/005; A01K 5/01; A01K 61/80
USPC ..... 239/687, 681, 666, 505, 665; 119/57.91, 119/51.11, 53
See application file for complete search history.

(56) References Cited

U.S. PATENT DOCUMENTS

| | | | | |
|---|---|---|---|---|
| 2,538,413 A | * | 1/1951 | Chard ................. | A01K 39/014 119/51.11 |
| 4,763,844 A | * | 8/1988 | van der Lely ....... | A01C 15/008 239/665 |
| 5,143,289 A | * | 9/1992 | Gresham ............. | A01K 5/0291 119/51.11 |
| 5,732,652 A | * | 3/1998 | Allen ................... | A01C 17/001 119/57.91 |
| 5,820,035 A | * | 10/1998 | Johnson .............. | A01C 17/005 239/684 |
| 6,637,678 B2 | * | 10/2003 | Wyne ................... | A01C 17/001 239/650 |
| 7,866,579 B2 | | 1/2011 | Chism | |
| 8,015,945 B1 | * | 9/2011 | Traywick ............. | A01K 5/0225 119/57.1 |
| 9,278,813 B2 | | 3/2016 | Meritt | |
| 9,301,495 B1 | * | 4/2016 | Bogart ................. | A01K 5/01 |
| 9,380,740 B2 | * | 7/2016 | Myers .................. | A01C 17/001 |
| 9,491,939 B2 | * | 11/2016 | Myers .................. | E01C 19/203 |

(Continued)

*Primary Examiner* — Yvonne R Abbott-Lewis
(74) *Attorney, Agent, or Firm* — Eric Karich; Karich & Associates

(57) ABSTRACT

An animal feeder has a hopper body adjustably mounted on a mounting base for directing feed material in a selected direction. The mounting base includes a pair of ground support elements pivotally mounted on a lateral support plate with a pair of pivot bolts, and further including a locking bolt that enables the lateral support plate to be pivotally adjusted with respect to the pair of ground support elements. The hopper body is rotatably mounted on the lateral support plate via a center bolt. A feed dispensing mechanism discharges the feed material through a feed discharge aperture, in a direction that is adjusted via the positioning of the adjustment base.

16 Claims, 4 Drawing Sheets

(56) References Cited

U.S. PATENT DOCUMENTS

| | | | |
|---|---|---|---|
| 9,700,014 B1* | 7/2017 | Bogart | A01K 5/0225 |
| 2002/0014545 A1* | 2/2002 | Woodruff | A01C 15/02 |
| | | | 239/650 |
| 2003/0192968 A1* | 10/2003 | Courtney | A01C 15/008 |
| | | | 239/687 |
| 2005/0241588 A1* | 11/2005 | Foster | A01K 5/0225 |
| | | | 119/57.91 |
| 2014/0131468 A1 | 5/2014 | Merritt | |
| 2018/0070530 A1* | 3/2018 | Beal | A01C 15/007 |

* cited by examiner

AUTOMATED FEEDER APPARATUS FOR DIRECTIONALLY DISCHARGING ANIMAL FEED

BACKGROUND OF THE INVENTION

Field of the Invention

This invention relates generally to mechanical animal feeders, and more particularly to an automated feeder apparatus for directionally discharging animal feed.

Description of Related Art

A common type of particulate spreader comprises a distribution member, such as a spinning disc, mounted for rotation about an upwardly extending rotary axis. Material such as seeds is typically directed from a container, such as a hopper, through an outlet port in the container and onto a spinning disc. On contact with the upper surface of the spinning disc centrifugal force spreads the material in an outward radial direction from the spinning disc. This type of system is typically used to broadcast feed material in a broad area all around the feeder.

Chism, U.S. Pat. No. 7,866,579, teaches a spreader for spreading feed material, which includes an upper bracket, a shaft, a return spring, a lower bracket, first and second sets of chain links, and a spreader plate. The upper and lower brackets are preferably aligned in the same vertical plane. The first and second chain links are located on opposite sides of the spreader and on either side of the shaft. Upon rotation of the spreader the first and second sets of chain links experience a centrifugal force sufficient to cause the spreader plate to move down the shaft and upon ceasing rotation the spreader plate returns to a default position proximate to the top of the shaft.

Meritt, U.S. Pat. No. 9,278,813, teaches an animal feed apparatus that contains and dispenses animal feed via a dispensing unit. The dispensing unit includes an entry port, a rotational assembly, an impeller, and an exit port. The rotational assembly includes a rotatable plate that retracts away from the entry port when the plate and impeller are rotating. Importantly, the impeller of Meritt is separate from and laterally spaced from the rotatable plate. Furthermore, while Merits does dispense the feed material in a specific direction, the base of the feed apparatus cannot be adjusted to direct the feed to a preferred direction.

The prior art teaches various forms of animal feeders. However, the prior art does not teach an animal feeder that includes an adjustable base that enables a stream of dispensed feed material to be directed to a specific location. The present invention fulfills these needs and provides further advantages as described in the following summary.

SUMMARY OF THE INVENTION

The present invention teaches certain benefits in construction and use which give rise to the objectives described below.

The present invention provides an animal feeder for directionally dispensing a feed material. The animal feeder includes a hopper body that defines a hopper interior for storing the feed material. A mounting base is provided for adjustably mounting the hopper body in an upright orientation. The mounting base includes a pair of ground support elements for supporting the animal feeder, each of the pair of ground support elements having a mounting flange; a lateral support plate having ends which each include a mounting wall; a pair of pivot bolts, each of the pivot bolts extending through one of the mounting walls and through one of the mounting flanges, to pivotally mount the lateral support plate between the pair of ground support elements; and a locking bolt that extends through one of the mounting walls and through a curved slot of one of the mounting flanges in a manner that enables the lateral support plate to be pivotally adjusted with respect to the pair of ground support elements. The hopper body is rotatably mounted on the lateral support plate via a center bolt, so that the hopper body may be rotated with respect to the mounting base. A feed outlet is provided through the hopper body so that feed material from the hopper body flows to a feed dispensing mechanism and is discharged through a feed discharge aperture, in a direction that is adjusted via the positioning of the adjustment base.

A primary objective of the present invention is to provide an animal feeder having advantages not taught by the prior art.

Another objective is to provide an animal feeder that discharges a feed material in a selected direction as adjusted via the positioning of an adjustment base.

A further objective is to provide an animal feeder that includes a feed dispensing mechanism that receives the feed material from a hopper and discharges it through an aperture in the selected direction.

A further objective is to provide an animal feeder that is easy to install, adjust, and use.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an animal feeder for directionally dispensing a feed material for consumption by animals. In the present invention, the animal feeder is adapted to be mounted on a dock for feeding fish. The feeder can be readily used in other environments for feeding other animals, and alternative uses should be considered within the scope of the present invention.

Figure 1:
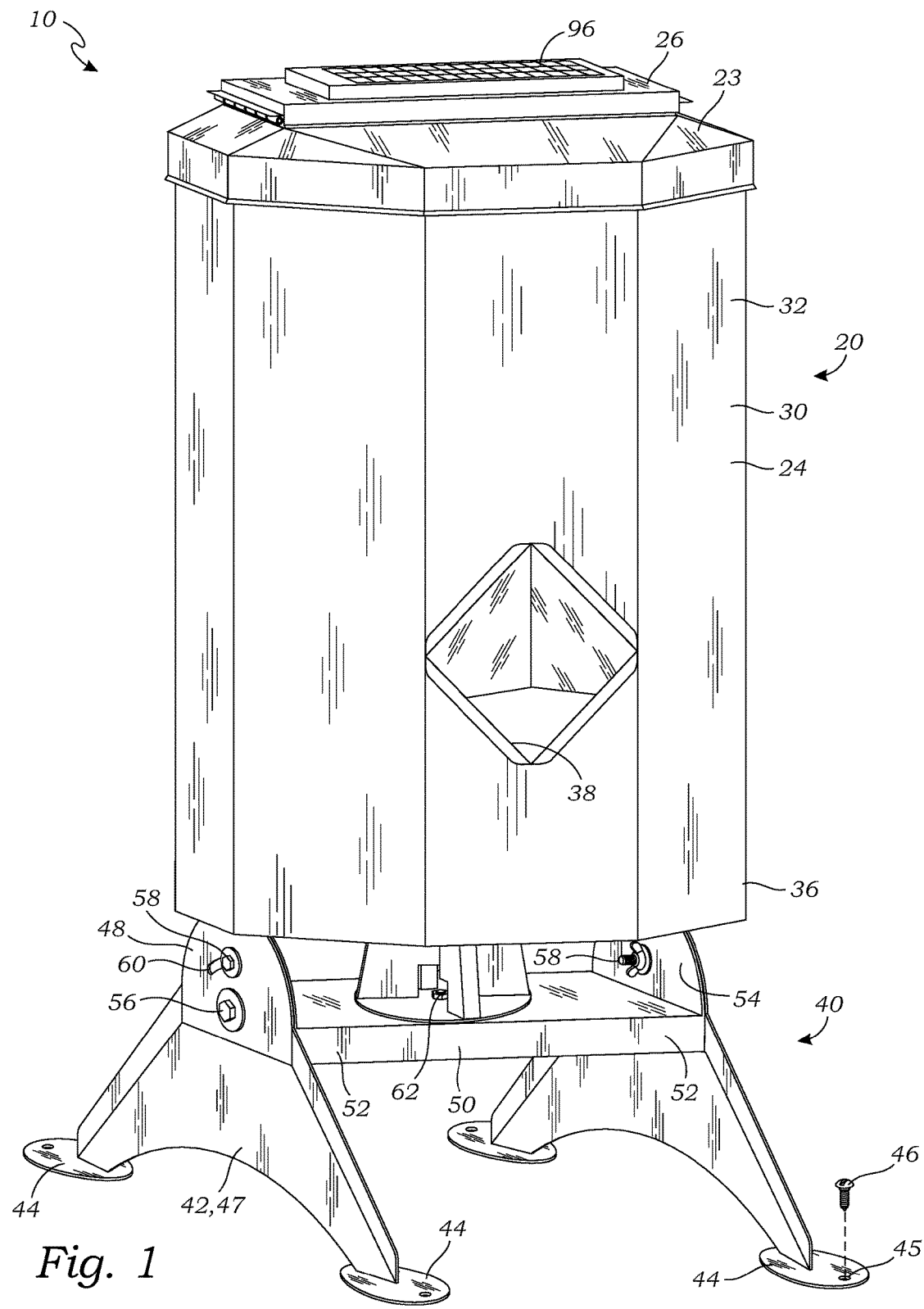
FIG. 1 is a perspective view of an animal feeder according to one embodiment of the present invention.
Figure 2:
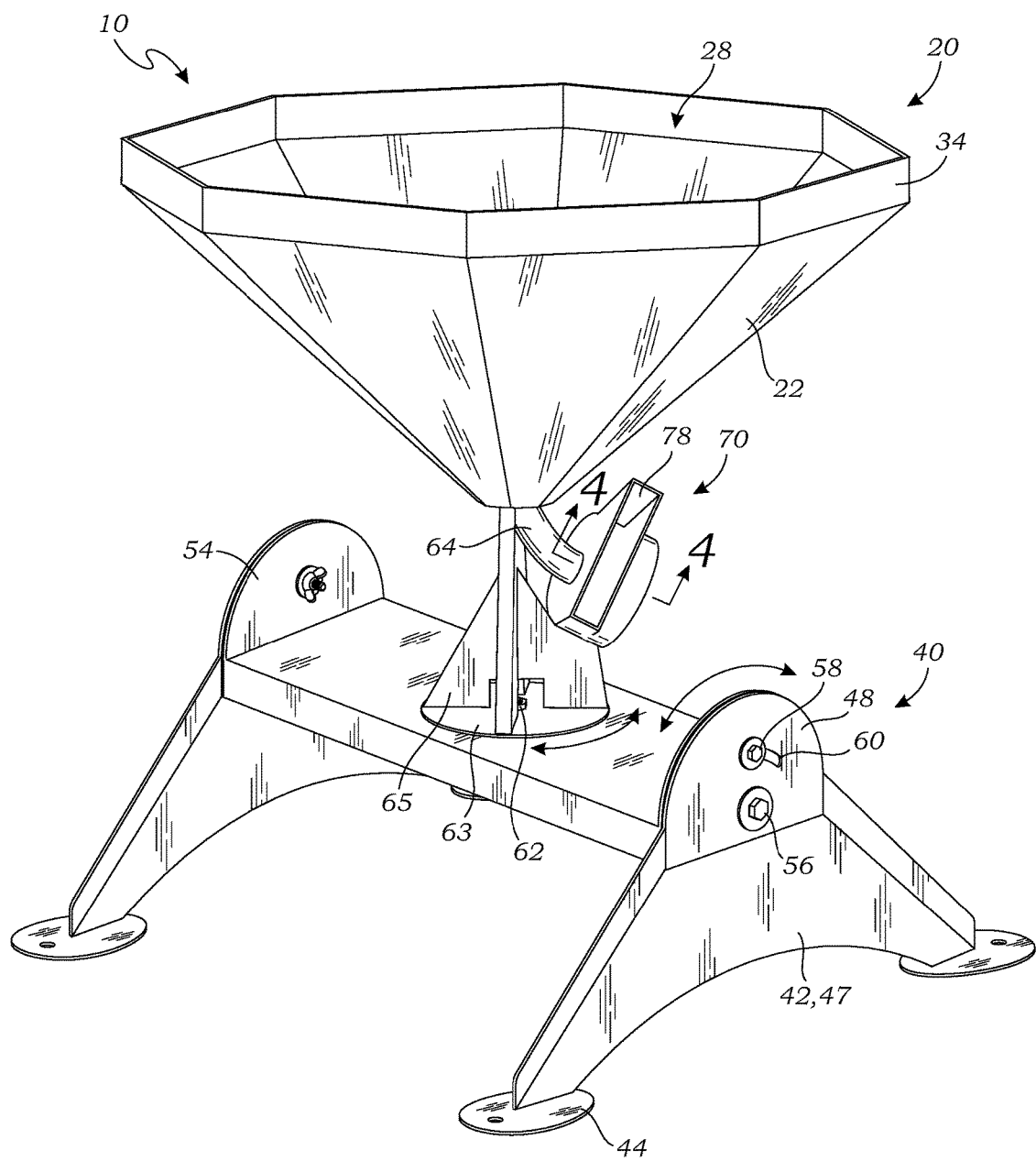
FIG. 2 is a perspective view of the animal feeder once a shroud has been removed, to better illustrate the internal construction of the animal feeder, including a mounting base, a hopper body, and a feed dispensing mechanism.

FIG. 1 is a perspective view of one embodiment of an animal feeder 10 according to the present invention. In this embodiment, the animal feeder includes a shroud 30 that covers most of the animal feeder 10. FIG. 2 is a perspective view of the animal feeder 10 once the shroud 30 of FIG. 1 has been removed, to better illustrate the internal construction of the animal feeder 10. As illustrated in FIGS. 1 and 2, the animal feeder 10 of this embodiment has a hopper body 20 for containing a feed material (reference number 12, shown in FIGS. 5-6).

In this embodiment, the hopper body 20 includes a bottom wall 22 (shown in FIG. 2), and other walls formed by the shroud 30 of FIG. 1, in this embodiment including side walls 24 that extends upwardly from the bottom wall 22, a top wall 23, and a cover 26 formed over part of the top wall 23. These walls together define a hopper interior 34 for storing the feed material 12. The bottom wall 22 may be of any shape, inverted pyramidal, parabolic upward, funnel-shaped, or even horizontal. In the present embodiment the bottom wall 22 is comprised of eight plates that form a roughly pyramidal shape. All of these walls may be designed in any form suitable for holding the feed material, as known in the art, and alternative configurations should be considered within the scope of the present invention.

As shown in FIG. 1, in this embodiment the side walls 24 are provided in the form of the shroud 30 that is mounted over an upper perimeter 34 of the bottom wall 22. The shroud 30 further includes an upwardly extending wall 32 that contains the feed material (shown in FIGS. 5-6), and a skirt 36 that extends downwardly for covering lower portions of the animal feeder 10. In the present embodiment, the shroud 30 is in the form of a generally tubular construction, in this case having an octagonal cross section. The skirt 36 portion of the shroud 30 may include a skirt 36 aperture for allowing the dispensing of the feed material through the skirt 36.

As shown in FIGS. 1 and 2, the animal feeder 10 includes a mounting base 40 for adjustably mounting the hopper body 20 in an upright orientation. The mounting base 40 of this embodiment includes a pair of ground support elements 42 for supporting the animal feeder 10, and a lateral support element 50, which together enable the animal feeder 10 to be adjusted to direct the feed material 12 to a particular selected location.

In this embodiment, each of the pair of ground support elements 42 includes a pair of feet 44 for contacting the ground, spaced apart by an elongate body 47, and further including a mounting flange 48 extending upwardly therefrom. In this embodiment, each of the pair of feet 44 includes a disk (in this case having an ovoid shape) for contacting the ground, each disk having a fastening aperture 45 that is shaped to receive a fastener 46 (e.g., nail, screw, staple, etc.) therethrough for fastening the ground support elements 42 to the ground upon which the animal feeder 10 is installed. In operation, for example, the ground support elements 42 may be nailed or screwed or otherwise fastened to a dock (not shown) or other wooden structure, so that the device does not fall into adjacent water.

The lateral support element 50, in this embodiment, is in the form of a lateral plate that is elongate in form (e.g., in this embodiment, generally rectangular in construction), and extends to opposed ends 52. In this embodiment, each of the ends includes a mounting wall 54. In this embodiment, both the mounting flange 48 and the mounting wall 54 are of matching size and shape in this case semicircular in construction, although other shapes and configurations may be used in alternative embodiments.

A pair of pivot bolts 56 are included, each of the pivot bolts 56 extending through one of the mounting walls 54 and through one of the mounting flanges 48, to pivotally mount the lateral support plate 50 between the pair of ground support elements 42. A locking bolt 58 extends through one of the mounting walls 54 and through a curved slot 60 of one of the mounting flanges 48 in a manner that enables the lateral support plate 50 to be pivotally adjusted with respect to the pair of ground support elements 42. The locking bolt 58 may be loosened to pivotally adjust the orientation of the hopper body 20 with respect to the mounting base 40, and then tightened again to lock the hopper body 20 into the selected position. For purposes of this application, the terms mounting wall 54 and mounting flange 48 are defined to be interchangeable, so that the curved slot 60 may be provided on either one, and an inverse construction (i.e., the curved slot 60 being on the mounting wall 54 rather than the mounting flange 48) is considered to be within the scope of the claimed invention.

As shown in FIGS. 1 and 2, the hopper body 20 is rotatably mounted on the lateral support plate 50 via a center bolt 62, so that the hopper body 20 may be rotated with respect to the mounting base 40. The center bolt 62 may also be tightened to lock the hopper body 20 in a selected position. The term "bolt" is defined to include any form of rod, fastener, post, or other construction known in the art that functions to fasten the two components together any yet also allow the two components to pivot with respect to each other, as shown. In the preferred embodiment, the center bolt 62 may be tightened to lock the hopper body 20 into a selected position.

In the embodiment of FIG. 2, the hopper body 20 further includes a rotation support plate 63 that is connected to a support strut 65 that extends downwardly from the hopper body 20, and the center bolt 62 extends through the rotation support plate 63, and wherein the rotation support plate 63 rests upon the lateral support plate 50 such that it is able to rotate thereupon around the center bolt 62.

A feed outlet 64 extends through the hopper body 20 such that the feed material 12 may fall through and escape from the hopper interior 28 to a feed dispensing mechanism 70 that is operably mounted to receive the feed material 12 and dispense it outwardly in a given direction. In this embodiment, the feed outlet 64 is in the form of a feeder tube, although other constructions may be devised by those skilled in the art.

Figure 3:
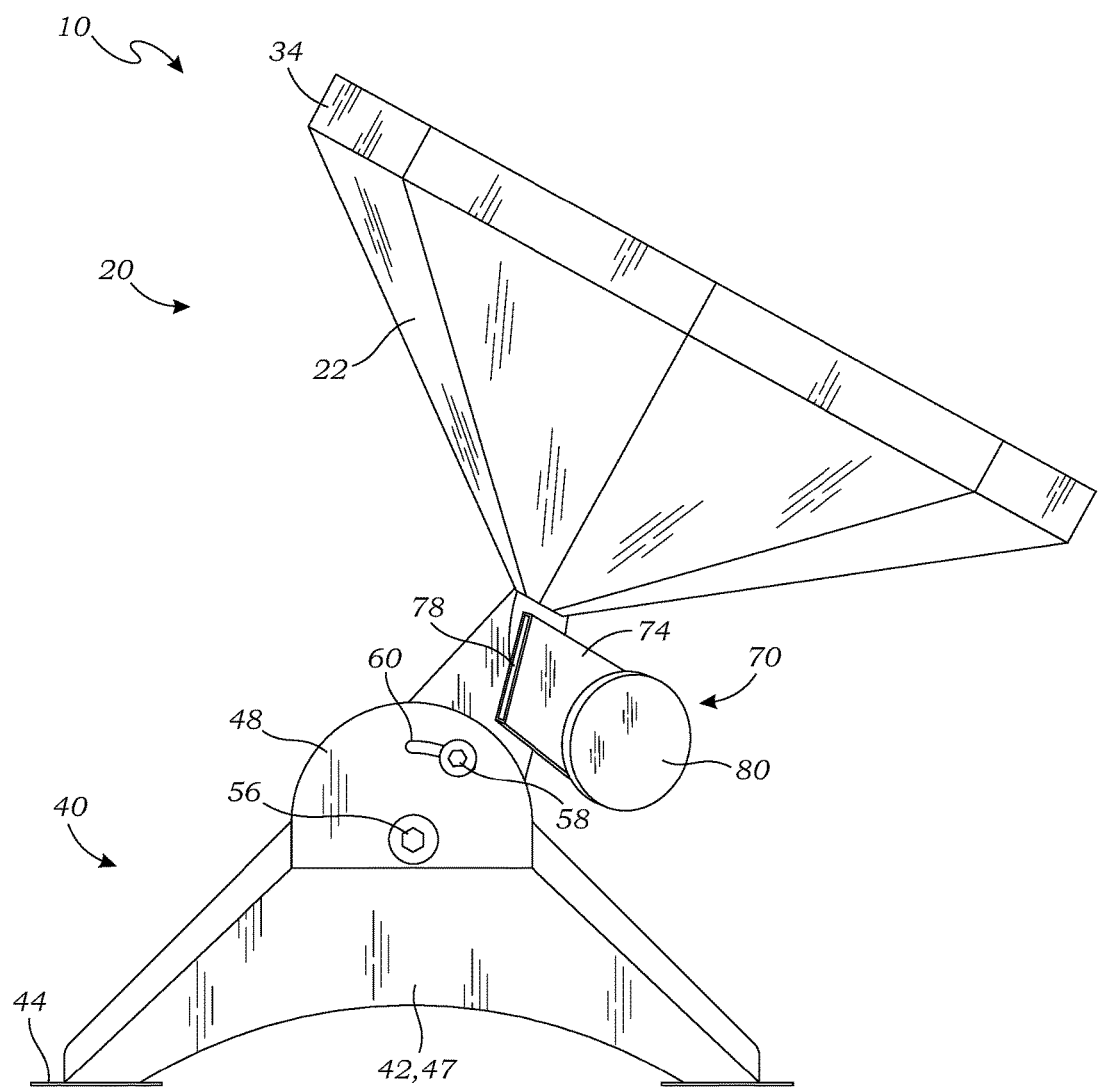
FIG. 3 is a side elevational sectional view thereof, illustrating the mounting base once it has been adjusted to a tilted orientation.

FIG. 3 is a side elevational sectional view thereof, illustrating the hopper body 20 once it has been adjusted to a tilted orientation. As shown in FIG. 3, when the locking bolt 58 (or bolts, in embodiments such as this, wherein there are two) has been loosened, the hopper body 20 may be tilted back with respect to the mounting base 40 (the bolt slides in the curved slot 60). Once in the desired location, the locking bolt 58 may be tightened to lock the hopper body 20 in place. This orientation adjusts the direction of the ejected animal feed, so that it may be directed where desired.

Figure 4:
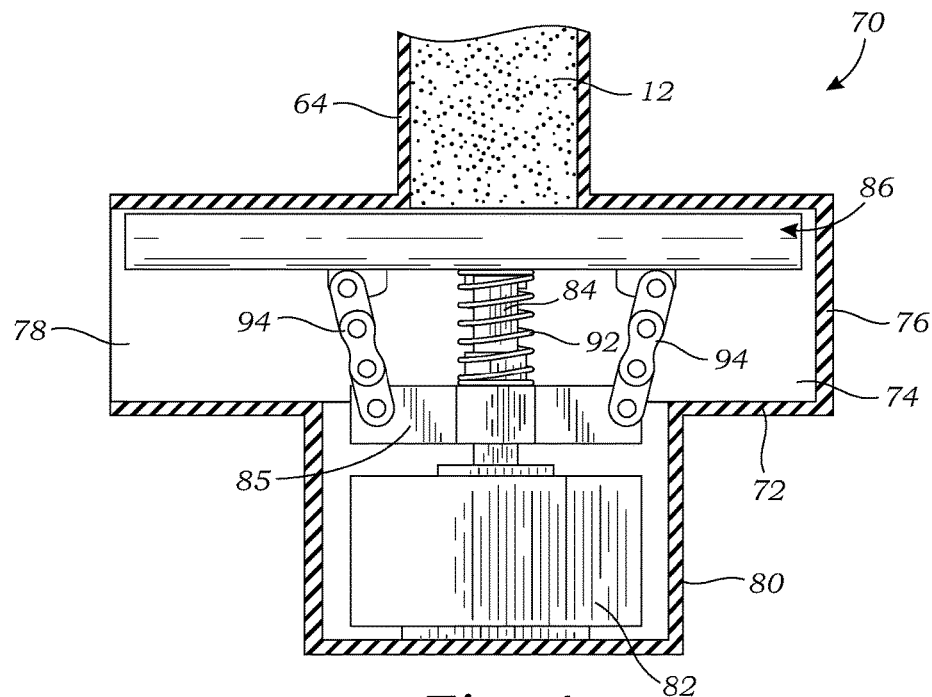
FIG. 4 is a sectional view thereof taken along line 4-4 in FIG. 2, illustrating a feed dispensing mechanism in a closed position.
Figure 5:
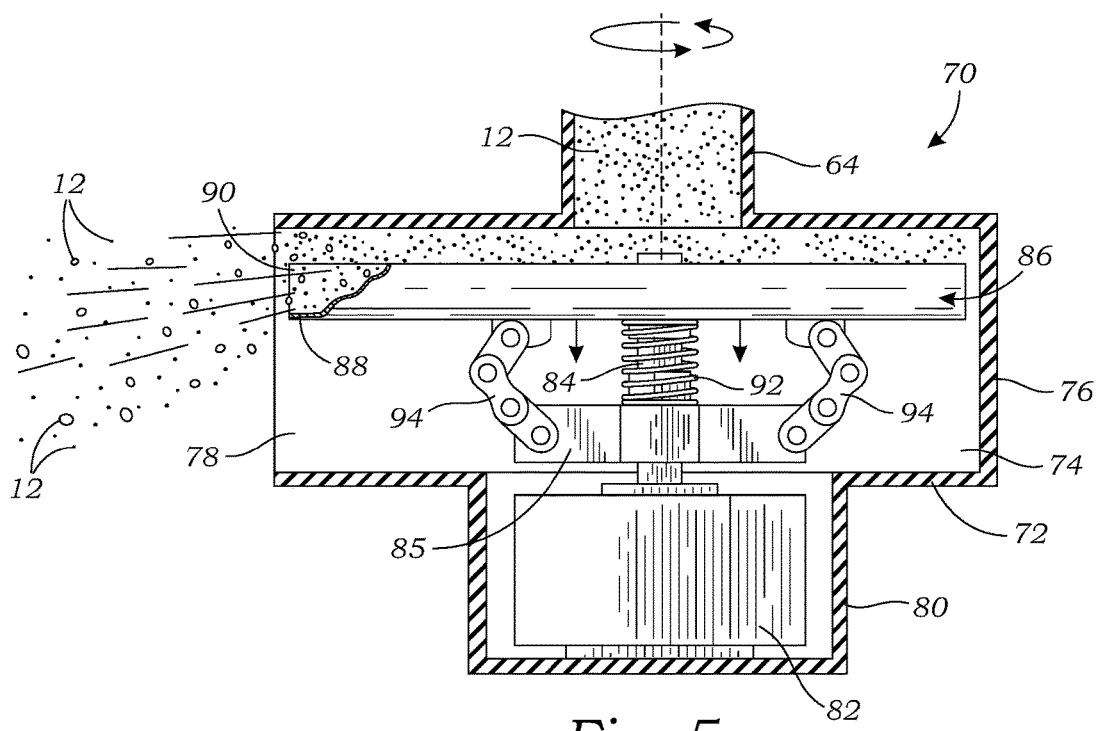
FIG. 5 is a sectional view thereof, illustrating the feed dispensing mechanism in an open position for dispensing the animal feed.

FIG. 4 is a sectional view thereof taken along line 4-4 in FIG. 2, illustrating the feed dispensing mechanism 70 in a closed position. FIG. 5 is a sectional view thereof, illustrating the feed dispensing mechanism 70 in an open position. As shown in FIGS. 4 and 5, the feed dispensing mechanism 70 comprises a dispensing housing 72 having an upper chamber 74 connected to the feed outlet 64 (in this case, the feeder tube), and a lower chamber 80. The upper chamber 74 has a perimeter wall 76 that is closed except for a feed discharge aperture 78, such that the feed material 12 is constrained by the perimeter wall 76, except for the feed discharge aperture 78, which enables the feed material 12 to be dispensed in a given direction.

As shown in FIGS. 4 and 5, a motor 82 is mounted in the lower chamber 80, and a shaft 84 of the motor 82 extends into the upper chamber 74. The shaft 84 is operably mounted on the motor 82 to spin with the motor 82. A dispensing plate 86 is operably mounted on the shaft 84 to rotate with the shaft 84, but also to be able to slide up and down the shaft 84. The dispensing plate 86 includes a planar component 88 and a dispensing wall 90 for imparting a centripetal force on the feed material 12 that falls onto the planar component 88 when the dispensing plate 86 is rotated. The dispensing plate 86 is mounted on the shaft 84 within the upper chamber 74.

In the present embodiment, the dispensing plate 86 is in the form of a plate with a U-shaped cross section; however, this embodiment is considered illustrative of one particular design, and alternative designs that may be developed by one skilled in the art may also be used, and such alternatives should be considered within the scope of the present invention.

In the embodiment of FIGS. 4 and 5, a rotating element 85 is attached to or otherwise extends from the shaft 84 such that the rotating element 85 rotates with the shaft 84. A spring 92 is positioned between the rotating element 85 and the dispensing plate 86 for biasing the dispensing plate 86 upwardly to a closed position wherein the dispensing plate 86 blocks the flow of the feed material 12 from the feeder tube. However, the bias of the spring 92 may be overcome, as discussed below, such that the dispensing plate 86 moves downwardly to an open position for dispensing the feed material 12.

A pair of linkages 94 are also provided, each connecting the rotating element 85 with the dispensing plate 86, such that when the pair of linkages 94 are rotated with the shaft 84, centripetal force forces the linkages 94 apart, thereby pulling the dispensing plate 86 downwardly against the bias of the spring 92 to the closed position, to uncover the feed outlet 64, so that the dispensing wall 90 ejects the feed material 12 through the feed discharge aperture 78. There may be two or more of the linkages 94 that, when rotating via the motor 82, are used to pull down the feed dispensing mechanism 70 against the upward force of the spring 92. The linkages 94 may be arranged generally vertically around the spring 92. The linkages 94 may be, for example, chains, bands, ropes, cables, or any flexible or otherwise laterally movable material or construction known to one skilled in the art. The linkages 94 may also have additional weights (not shown) for providing additional angular momentum when rotating, rather than relying solely on the mass of the weighted tension element itself. While FIGS. 4 and 5 illustrate one embodiment of the linkages 94, those skilled in the art may devise alternative embodiments, and these alternative or equivalent are considered within the scope of the present invention.

The motor 82 may be powered by a battery, or by an external power source. The motor 82 may be of any type known to one skilled in the art, such as electric, gasoline, etc.; however, those skilled in the art may devise alternative embodiments, and these alternative or equivalent are considered within the scope of the present invention.

As shown in FIG. 1, the cover 26 may include a solar panel 96 connected with the battery (not shown), and a timer (not shown) for controlling the operation of the device. The timer may be any kind of timer known to one skilled in the art capable of activating the animal feeder 10 at one or more set times.

As used in this application, the words "connecting," "attaching," and "mounting," are taken to mean any method or combination of steps needed to attain the desired operative result.

For example, such methods may include welding, bolting, gluing, tying, clamping, or any other intermediate steps known to one skilled in the art for the purposes of manufacturing the present invention.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. An animal feeder for directionally dispensing a feed material, the animal feeder comprising:
   a hopper body that defines a hopper interior for storing the feed material;
   a mounting base for adjustably mounting the hopper body, the mounting base comprising:
      a pair of ground support elements, each of the pair of ground support elements having a mounting flange;
      a lateral support plate having ends which each include a mounting wall;
      a pair of pivot bolts, each of the pivot bolts extending through one of the mounting walls and through one of the mounting flanges, to pivotally mount the lateral support plate between the pair of ground support elements; and
      a locking bolt that extends through one of the mounting walls and through a curved slot of one of the mounting flanges in a manner that enables the lateral support plate to be pivotally adjusted with respect to the pair of ground support elements;
   the hopper body being rotatably mounted on the lateral support plate via a center bolt, so that the hopper body may be rotated with respect to the mounting base;
   a feed outlet through the hopper body; and
   a feed dispensing mechanism operably mounted to receive the feed material from the feed outlet and dispense the feed mechanism through a feed discharge aperture, in a direction that is adjusted via the positioning of the mounting base.

2. The animal feeder of claim 1, wherein the feed dispensing mechanism comprises:
   a dispensing housing having an upper chamber connected to the feed outlet via a feeder tube, and a lower chamber, the upper chamber having a perimeter wall that is closed except for a feed discharge aperture;
   a motor mounted in the lower chamber;
   a shaft of the motor that extends into the upper chamber;
   a dispensing plate that includes a planar component and a dispensing wall for imparting a centripetal force on the feed that falls onto the planar component when the dispensing plate is rotated, the dispensing plate being mounted on the shaft within the upper chamber;
   a rotating element attached to or extending from the shaft such that the rotating element rotates with the shaft;
   a spring between the rotating element and the dispensing plate for biasing the dispensing plate upwardly to a closed position wherein the dispensing plate blocks the flow of the feed material from the feeder tube; and
   a pair of linkages each connecting the rotating element and the dispensing plate, such that when the pair of linkages are rotated with the shaft, centripetal force forces the linkages apart, thereby pulling the dispensing plate downwardly against the bias of the spring to uncover the feed outlet, so that the dispensing wall ejects the feed material through the feed discharge aperture.

3. The animal feeder of claim 1, further comprising a shroud that is mounted over an upper perimeter the hopper body.

4. The animal feeder of claim 3, wherein the shroud includes an upwardly extending wall, and a skirt that extends downwardly for covering the feed dispensing mechanism of the animal feeder.

5. The animal feeder of claim 4, wherein the skirt of the shroud includes a skirt aperture for allowing the dispensing of the feed material through the skirt.

6. The animal feeder of claim 5, wherein the shroud has a tubular construction.

7. The animal feeder of claim 6, wherein the shroud has an octagonal cross section.

8. The animal feeder of claim 1, wherein each of the ground support elements includes a pair of feet, spaced apart by an elongate body, and further including a mounting flange extending upwardly therefrom.

9. The animal feeder of claim 8, wherein each of the pair of feet includes a fastening aperture shaped to receive a fastener therethrough for fastening the ground support elements to the ground upon which the animal feeder is installed.

10. The animal feeder of claim 1, wherein the hopper body includes a rotation support plate that is connected to a support strut that extends downwardly from the hopper body; the center bolt extends through the rotation support plate and the lateral support plate; and wherein the rotation support plate rests upon the lateral support plate such that it is able to rotate thereupon around the center bolt.

11. An animal feeder for directionally dispensing a feed material, the animal feeder comprising:
a hopper body that defines a hopper interior for storing the feed material, the hopper body being supported upon a mounting wall;
a mounting base for adjustably mounting the hopper body, the mounting base comprising a pair of ground support elements;
a pair of pivot bolts, each of the pivot bolts extending through one of the mounting walls and through one of the ground support elements, to pivotally mount the hopper body upon the pair of ground support elements;
a feed outlet through the hopper body; and
a feed dispensing mechanism mounted on the hopper body to receive the feed material from the feed outlet and dispense the feed material at an angle that is adjusted via the positioning of the hopper body relative to the mounting base upon the pair of pivot bolts.

12. The animal feeder of claim 11, further comprising a shroud that is mounted over an upper perimeter the hopper body.

13. The animal feeder of claim 11, wherein each of the ground support elements includes an elongate body, and a mounting flange extending upwardly therefrom.

14. The animal feeder of claim 13, wherein each of the elongate body includes a fastening aperture shaped to receive a fastener therethrough for fastening the ground support elements to the ground upon which the animal feeder is installed.

15. The animal feeder of claim 11, wherein the hopper body comprises: a rotation support plate that is connected to a support strut that extends downwardly from the hopper body; a center bolt that extends through the rotation support plate and the lateral support plate; and wherein the rotation support plate rests upon the lateral support plate such that it is able to rotate thereupon around the center bolt.

16. An animal feeder for directionally dispensing a feed material, the animal feeder comprising:
a mounting base;
a hopper body that defines a hopper interior for storing the feed material, the hopper body being pivotally mounted on the mounting base; and
a feed dispensing mechanism fixedly mounted to the hopper body so that the feed dispensing mechanism pivots along with the hopper body on the mounting base, the feed dispensing mechanism being positioned to receive the feed material from the feed outlet and dispense the feed material at an angle that is adjusted via the positioning of the hopper body relative to the mounting base.

* * * * *